March 19, 1935.  J. C. COX  1,994,504
VEHICLE CONSTRUCTION
Filed Sept. 17, 1931

Inventor
JOHN C. COX
By
Att'y.

Patented Mar. 19, 1935

1,994,504

UNITED STATES PATENT OFFICE 1,994,504

VEHICLE CONSTRUCTION

John C. Cox, St. Louis, Mo., assignor to Wagner Electric Corporation, St. Louis, Mo., a corporation of Delaware Application September 17, 1931, Serial No. 563,242

6 Claims. (Cl. 280—124)

My invention relates to motor vehicles and more particularly to motor vehicles which are provided with means for preventing the transmission of shocks through the steering mechanism to the arms of the operator of the vehicle.

In present day automobile construction, shock absorbing means have been provided between one of the front springs of the vehicle and the frame to reduce the transmission to the steering mechanism, of shocks occasioned by the front wheels passing over obstructions in the road.

This shock absorbing means allows the spring and axle upon one side of the vehicle to move slightly longitudinally with respect to the frame against a yieldable backing as the obstruction is encountered by the wheel. While the shock absorbing means functions very well in decreasing the transmission of shocks, it has been found when the vehicle is equipped with front wheel brakes there often results a swerving of the front wheels when the brakes are applied due to the absorption of the reaction of the brakes causing the axle and the spring on the side equipped with the shock absorbing device to move longitudinally of the frame.

It is the principal object of my invention to provide a device that will disable the shock absorbing means referred to when the brakes are applied and thereby prevent the axle and spring on one side of the vehicle from moving longitudinally with respect to the frame.

Another object of my invention is to produce a device for the purpose described which, in hydraulically braked vehicles, will be automatically operated when the brakes are applied.

Still another object of my invention is to produce a device of the type referred to that is positive in operation, easy to install, and which will not materially add to the initial cost of the braking system.

Figure 1:
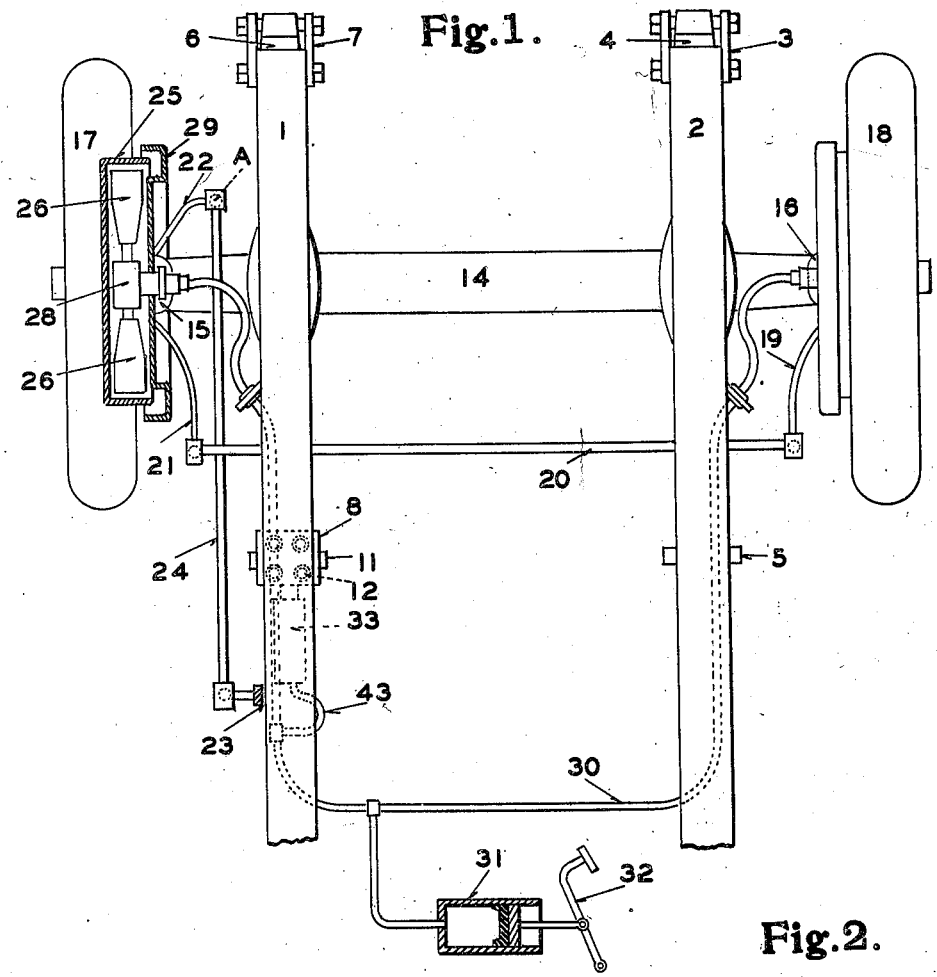
Figure 2:
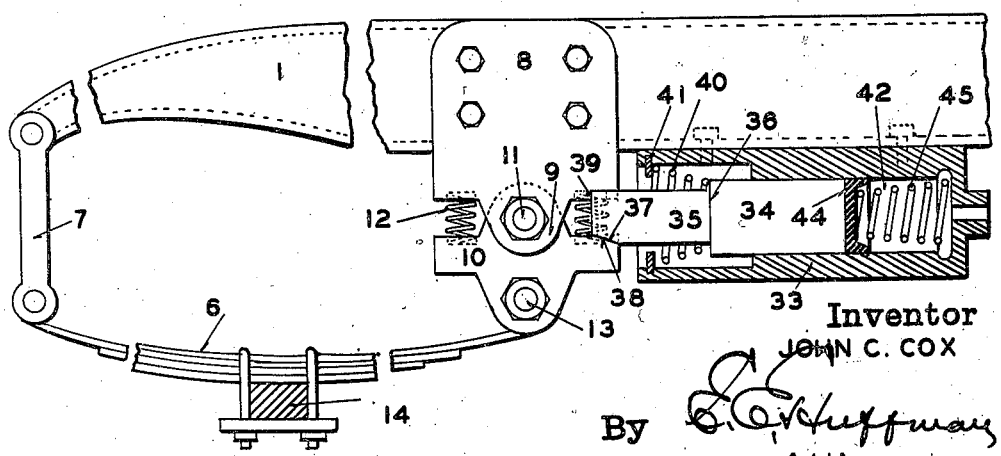

Other objects will become apparent from the following description taken in connection with the accompanying drawing disclosing an embodiment of my invention in which Figure 1 is a diagrammatic view of the front end of a motor vehicle equipped with a shock absorbing device and with a hydraulic braking system; and Figure 2 is a side view, partly in section, of the vehicle frame and left front spring equipped with a shock absorbing means, and with my novel disabling device.

Referring to the drawing in detail, 1 and 2 indicate respectively the left and right frame members of the motor vehicle. The frame member 2 is connected at its front end by means of a hanger 3 to the front end of a supporting spring 4, the rear end of which is suitably connected by means of a bolt 5 with an intermediate part of the frame member 2 in the well known manner.

A second supporting spring 6 is connected at its front end with the front of the frame member 1 by means of a hanger 7. The rear end of the spring 6, however, is connected to the intermediate part of the frame member 1 by means of a shock absorbing device. This connection consists of an angular bracket 8 fixed to the frame member 1 by suitable means and is provided upon its lower side with downwardly extending ears 9 to which is pivoted a hanger member 10 by a pin 11. The hanger member 10 is in the form of a plate and has interposed between it and the bottom of the bracket 8, four springs 12, two on each side of the pivot pin 11. The rear end of the spring 6 is connected to the hanger member 10 by a pivot pin 13 passing through downwardly extended ears integral with the hanger.

The front axle beam 14 extends transversely of the frame members and is secured to the underside of the supporting springs 4 and 6 in the well known manner. The ends of the axle beam 14 are provided with the usual pivoted wheel spindles 15 and 16, upon which the wheels 17 and 18 are rotatable. A spindle arm 19 is secured to the spindle 16 and is connected by a tie rod 20 with a similar spindle arm 21 secured to the spindle 15. The spindle 15 is also provided with a steering arm 22 which is connected to the drop arm 23 of the steering gear by means of a drag link 24.

Each of the front wheels are provided with hydraulically actuated brakes comprising a drum 25, brake shoes 26, and wheel cylinder 28 secured to a backing plate 29, all of well known construction. Suitable fluid conduits 30 extend from each wheel cylinder to the master cylinder 31 which is actuated by a brake pedal 32.

All of the structure so far described is of standard construction and forms no part of my invention. From the above structure, however, it can be clearly seen that when the vehicle is in motion and the wheel 17 engages an obstruction in the road surface, the wheel, axle beam, and spring 6 will move slightly longitudinally with respect to the frame member 1 due to the pivoting of the hanger 10 to the bracket 8, and the rear coil springs 12 will, therefore, absorb the shock.

Since this action is only momentary, as the coil springs 12 immediately return the spring 6 and axle to its normal position, there will be little effect upon the steering mechanism. However, when the brakes are applied and the brake reaction is absorbed, the left wheel 17, left end of the axle beam, and the spring 6 will move slightly rearwardly with respect to the frame member 1 and remain in such position as long as the brakes are applied. Since the steering drop arm 23 is fixed by the irreversibility of the steering gear, the drag link will not move and, therefore, the pivot connection "A" between the drag link and the steering arm 22 will also be fixed for a given position of the steering gear. The point "A", therefore, being fixed and the spindle 15 and end of the axle beam having moved rearwardly, the wheel 17 will be turned to the left. Also, since the wheel 18 is connected to the wheel 17 by means of the spindle arms 19 and 21 and tie rod 20, it also will be moved to the left, causing the vehicle to swerve, that is, be steered to the left without movement of the steering wheel and steering gear. To compensate for this swerving effect as the brakes are applied, the operator of the vehicle must pull on his steering wheel, which makes an objectionable feature in driving. It is also readily seen that this swerving of the wheels may lead to accidents if the operator is not accustomed to compensating for such by pulling on the steering wheel. This swerving of the front wheels could be somewhat overcome by setting the right brake to do more work than the left, but under conditions where the reaction of the left brake is insufficient to cause the spring to move longitudinally with respect to the frame, the vehicle would have a tendency to pull or swerve to the right, which would be just as undesirable as the opposite tendency. I have, therefore, devised means applicable to hydraulically actuated brakes whereby this shock absorbing device can be blocked out or disabled when the brakes are applied, thereby eliminating the swerving of the front wheels without changing the equalization of the brakes. In accordance with this feature, I have secured a cylinder 33 to the frame member 1 just back of the shock absorbing means, the bore of which has slidable therein a piston 34. The external end 35 of the piston is of smaller diameter than the diameter of the piston to form a shoulder 36. The end 35 is adapted to slide into the space between the bracket 8 and the hanger member 10 and to absolutely prevent the spring 6 from moving longitudinally of the frame by rocking the hanger member 10. The lower side of the end 35 of the piston is provided with a beveled surface 37 as is the cooperating surface of the hanger member, indicated at 38, to assist in the insertion of the end of the piston between the bracket 8 and hanger 10. The bracket is also provided with a shoulder 39 for limiting the extent of insertion of the piston. A spring 40 is provided between the shoulder 36 on the piston and a removable shoulder 41 on the surface of an enlarged part of the cylinder to retract the piston from between the bracket 8 and the hanger member 10. The end of the cylinder containing the fluid receiving chamber 42 is connected by a conduit 43 with the adjacent main fluid conduit 30 of the brake actuating system. A sealing cup 44 held against the piston 34 by means of a relatively weak spring 45 completes the structure for disabling the shock absorbing means.

In the operation of my invention, the entire braking system will be filled with a suitable fluid as well as the conduit 43 and the chamber 42. The piston 34 will be normally in the retracted position, that is, not inserted between the bracket 8 and hanger member 10, due to the spring 40 being of a greater strength than the spring 45, and the shock absorbing means will, therefore, operate in its usual way to absorb the shocks resulting from an uneven road. Upon application of the brakes by movement of the brake pedal 32, fluid under pressure will be forced into the wheel cylinders 28 and the fluid chamber 42 to simultaneously apply the brakes and move the piston 35 into the space between the bracket 8 and the hanger member 10 and disable the shock absorbing means whereby the spring 6 and the left side of the axle beam is prevented from moving longitudinally with respect to the frame to cause the swerving action. As soon as the brakes are released, the piston 35 is returned to its normal position and the shock absorbing means again functions in its usual manner.

If, at the instant the brakes are applied, the hanger member 10 is slightly tilted with respect to the base of the bracket 8, the piston 34 will not be prevented from being inserted, due to the beveled surfaces 37 and 38, thereby insuring positive disabling of the shock absorbing means at any desired time. The cylinder 33 and piston 35 can be made very small as the only fluid pressure necessary is that required to overcome the return spring 40 and to move the piston. It is also to be noted that the efficiency of the brakes is in no way affected by my disabling device for as soon as the end 35 of the piston abuts the shoulder 39 there will be no parts moved by the fluid pressure except the brake shoes, which is the usual condition in the operation of the brakes.

Other types of shock absorbing means are applicable to the supporting spring 6 to absorb the shocks due to uneven roads and may be disabled by appropriately designed means embodying my invention and I, therefore, do not intend that the scope of my invention be limited to any specific form of mechanical element for engaging with a shock absorbing device to render it inoperative during brake application.

Having fully described my invention, what I claim as new and desire to secure by Letters Patent of the United States is:

1. In a motor vehicle having a braking system, a front axle, a frame, a frame supporting spring carried by the axle and connected at each end to the frame by a hanger, and yieldable means for biasing one of the hangers to a vertical position, said hangers and yieldable means permitting slight longitudinal movement of the axle under influence of road shocks communicated to the axle, means operated when the brakes are applied to hold said hanger in its biased position.

2. In a motor vehicle having a frame, a supporting spring connected by a hanger at each end to the frame, and means for biasing one of the hangers to a vertical position whereby the spring is capable of slight longitudinal movement relative to the frame under the influence of road shocks communicated thereto, means adapted to be inserted between the hanger and the frame to prevent said movement, and means for operating said last named means from the operator's compartment of the vehicle.

3. In a motor vehicle having a fluid braking system, a frame, a supporting spring connected by a hanger at each end to the frame, and means for biasing one of the hangers to a vertical position whereby the spring is capable of slight longitudinal movement relative to the frame under the influence of road shocks communicated thereto, means adapted to be inserted between the hanger and the frame to prevent said movement.

and means including a piston and cylinder connected to the braking system for operating said last named means when the brakes are applied.

4. In apparatus of the class described, the combination of a vehicle frame, a supporting spring therefor, a hanger connecting the spring to the frame, means for biasing the hanger to a vertical position, means for preventing said hanger from moving in one direction from its biased position, fluid pressure controlled means including a piston and cylinder for actuating said second named means, and means for returning said second named means to normal position upon release of the fluid pressure.

5. In apparatus of the class described, the combination of a vehicle frame, a supporting spring therefor, a hanger connecting the spring to the frame, means for biasing the hanger to a vertical position, means adapted to be inserted between the hanger and the frame to prevent the hanger from moving in one direction from its biased position, a stop for limiting the movement of said second named means, and fluid pressure controlled means for actuating said second named means.

6. In a motor vehicle, the combination of brake actuating means, a movably mounted spring shackle, locking means operable by the brake actuating means of the vehicle adapted to rigidly fix the shackle member when the brakes are applied, and means associated with and adapted to cause a release of the locking means when the brakes are released.

JOHN C. COX.